US012427736B2

(12) United States Patent
Ishizaki et al.

(10) Patent No.: US 12,427,736 B2
(45) Date of Patent: Sep. 30, 2025

(54) METHOD FOR MANUFACTURING SPECTACLE LENS

(71) Applicant: HOYA LENS THAILAND LTD., Pathumthani (TH)

(72) Inventors: Takako Ishizaki, Tokyo (JP); Shigetoshi Kono, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 1091 days.

(21) Appl. No.: 16/803,506

(22) Filed: Feb. 27, 2020

(65) Prior Publication Data

US 2020/0198267 A1 Jun. 25, 2020

Related U.S. Application Data

(63) Continuation of application No. PCT/JP2019/014002, filed on Mar. 29, 2019.

(30) Foreign Application Priority Data

Mar. 30, 2018 (JP) ................................ 2018-068069

(51) Int. Cl.
*B29D 11/00* (2006.01)
*G02C 7/02* (2006.01)

(52) U.S. Cl.
CPC .. *B29D 11/00326* (2013.01); *B29D 11/00009* (2013.01); *B29D 11/00884* (2013.01); *B29D 11/00442* (2013.01); *G02C 7/022* (2013.01)

(58) Field of Classification Search
CPC ................................................ B29D 11/00326
See application file for complete search history.

(56) References Cited

U.S. PATENT DOCUMENTS

2008/0050601 A1* 2/2008 Otani ...................... C08J 7/043 428/446
2012/0140323 A1* 6/2012 Yajima ............ B29D 11/00644 427/163.1
2012/0259411 A1* 10/2012 Hong .................... G02C 7/049 351/159.01
2013/0059068 A1 3/2013 Yajima

FOREIGN PATENT DOCUMENTS

CN 102378677 A 3/2012
CN 104335076 A 2/2015
CN 107430210 A 12/2017
(Continued)

OTHER PUBLICATIONS

PCT/JP2019/014002, English translation of International Search Report, Jun. 25, 2019, 2 pages.
(Continued)

*Primary Examiner* — Robert A Vetere
(74) *Attorney, Agent, or Firm* — Oliff PLC

(57) ABSTRACT

Provided is a method for manufacturing a spectacle lens, wherein: the spectacle lens includes a lens substrate having microprotrusions on at least one surface, and a coating film formed on the surface of the lens substrate that has the microprotrusions; and the method includes forming the coating film by applying an application liquid, through spin-coating, to the surface of the lens substrate that has the microprotrusions.

6 Claims, 1 Drawing Sheet

1
10 8 4
2
6 6 6 6 10 8 3

(56) References Cited

FOREIGN PATENT DOCUMENTS

| | | | |
|---|---|---|---|
| CN | 206757219 | U | 12/2017 |
| EP | 3 730 269 | A1 | 10/2020 |
| EP | 3 730 270 | A1 | 10/2020 |
| EP | 3 779 573 | A1 | 2/2021 |
| JP | 2009113448 | A | 5/2009 |
| JP | 2009180674 | A | 8/2009 |
| JP | 2010107974 | A | 5/2010 |
| JP | 2011051082 | A | 3/2011 |
| JP | 2013171087 | A | 9/2013 |
| JP | 2013205559 | A | 10/2013 |
| JP | 2014044351 | A | 3/2014 |
| JP | 2016018030 | A | 2/2016 |
| JP | 2016024456 | A | 2/2016 |
| WO | 2010113996 | A1 | 10/2010 |
| WO | 2016142496 | A1 | 9/2016 |

OTHER PUBLICATIONS

PCT/JP2019/014002, "International Search Report and Written Opinion", Jun. 25, 2019, 9 pages.

PCT/JP2019/014002, "International Preliminary Report on Patentability", with English Translation, Oct. 15, 2020, 15 pages.

CN201980004223.6, "First Office Action" with machine translation, Feb. 24, 2021, 12 pages.

EP19776135.6, "Extended European Search Report", Dec. 1, 2021, 6 pages.

JP2018-068069, "Notice of Reasons for Refusal" with Machine Translation, Jan. 19, 2021, 7 pages.

Jul. 22, 2025 Office Action issued in European Patent Application No. 19776135.6.

* cited by examiner

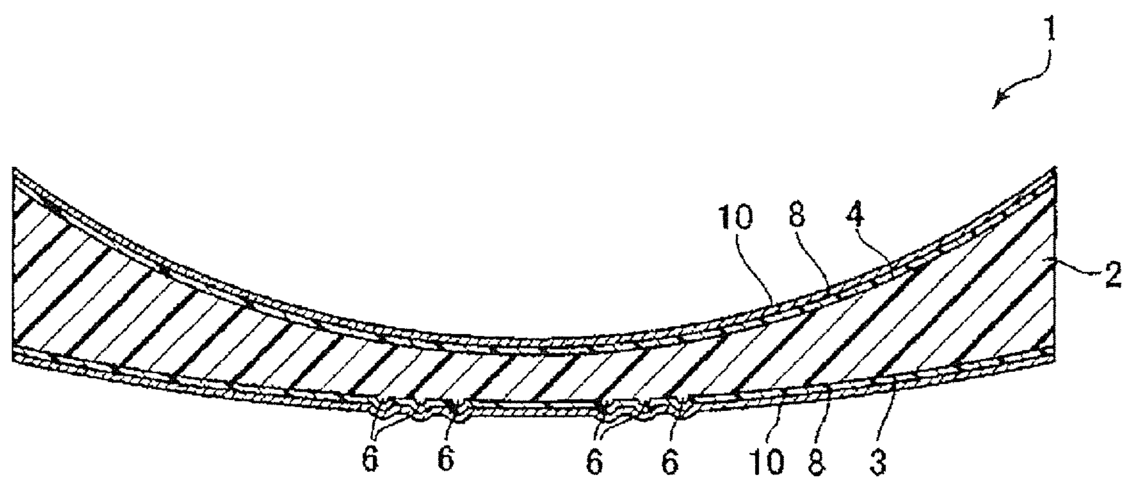
1
10
8
4
2
6
6
6
6
10
8
3

METHOD FOR MANUFACTURING SPECTACLE LENS

CROSS-REFERENCE TO RELATED APPLICATIONS

This application is a Continuation of PCT International Application No. PCT/JP2019/014002 filed on Mar. 29, 2019, which was published under PCT Article 21(2) in Japanese. The above application is hereby expressly incorporated by reference, in its entirety, into the present application.

TECHNICAL FIELD

The present disclosure relates to a method for manufacturing a spectacle lens.

BACKGROUND ART

Generally, a variety of types of performance are imparted to a lens substrate by providing various coating films on the lens substrate. Such a coating film can be formed, for example, through a step of applying an application liquid (see, for example, Japanese Patent Application Publication No. 2014-44351, which is hereby expressly incorporated by reference in its entirety).

SUMMARY

In recent years, it has been practiced to adjust the refractive power of a spectacle lens or to give the spectacle lens a design by providing microprotrusions on at least one surface of the spectacle lens. Such a spectacle lens can be produced, for example, by using a lens substrate having microprotrusions on at least one surface and providing a coating film on the lens substrate. Accordingly, the present inventors have studied the method for applying an application liquid to the surface of a lens substrate having microprotrusions to provide a coating film, and revealed a problem that the film thickness of the coating film is uneven on the microprotrusions and around the microprotrusions.

According to one aspect of the present disclosure, there is provided a method for manufacturing a spectacle lens excellent in uniformity of the thickness of a coating film formed by applying an application liquid to a surface including microprotrusions.

Solution to Problem

One aspect of the present disclosure relates to a method for manufacturing a spectacle lens, wherein the spectacle lens includes

- a lens substrate having microprotrusions on at least one surface, and
- a coating film formed on the surface of the lens substrate that has the microprotrusions; and
- the method includes forming the coating film by applying an application liquid, through spin coating, to the surface of the lens substrate that has the microprotrusions.

According to one aspect of the present disclosure, it is possible to manufacture a spectacle lens in which a coating film excellent in thickness uniformity is formed on the surface that has microprotrusions.

BRIEF DESCRIPTION OF DRAWINGS

FIG. 1 is a cross-sectional view illustrating an example of a spectacle lens manufactured by a method for manufacturing a spectacle lens according to one embodiment of the present disclosure.

DESCRIPTION OF EMBODIMENTS

Hereinafter, the method for manufacturing the spectacle lens will be described in more detail. The description based on the drawings below is an exemplification, and the present disclosure is not limited to the illustrated embodiment.

[Lens Substrate]

FIG. 1 is a cross-sectional view illustrating an example of a spectacle lens produced by the method for manufacturing a spectacle lens according to one embodiment of the present disclosure. In FIG. 1, a spectacle lens 1 includes a lens substrate 2, and the lens substrate 2 has an object-side surface 3 and an eyeball-side surface 4. The "object-side surface" is located on the object side when the spectacles provided with spectacle lenses are worn by a wearer, and the "eyeball-side surface" is located on the opposite side, that is, on the eyeball side when the spectacles provided with spectacle lenses are worn by a wearer. The lens substrate surface may be any of a convex surface, a concave surface, and a flat surface. The type of spectacle lens is determined by the surface shape of both surfaces of the lens substrate. In FIG. 1, the object-side surface 3 is convex, and the eyeball-side surface 4 is concave. However, the surface shape of the spectacle lens produced by the manufacturing method is not limited to this.

In FIG. 1, the spectacle lens 1 includes a hard coat layer 8 formed on the object-side surface 3 and the eyeball side surface 4 of the lens substrate 2, and an antireflection layer 10 formed on the surface of the hard coat layer 8.

On the object-side surface 3 of the lens substrate 2, a plurality of microprotrusions (projections) 6 is formed around the center of the lens (for example, an optical center or a fitting point). One or more, or a plurality of, microprotrusions is arranged on at least one surface of the lens substrate. The size of the microprotrusions and the mode of arrangement of the plurality of microprotrusions on the surface of the lens substrate are not particularly limited and can be determined from the viewpoint of, for example, visibility of the microprotrusions from the outside, design property to be imparted by the microprotrusions, adjustment of the refractive power by the microprotrusions, and the like. The height of the microprotrusion can be, for example, 0.1 μm to 10 μm, and the radius of curvature of the surface of the microprotrusion can be, for example, 50 mmR to 250 mmR. Further, the distance between the adjacent microprotrusions (the distance between the end of a certain microprotrusion and the end portion of a microprotrusion adjacent to the microprotrusion) is, for example, about the same as the value of the radius of the microprotrusion. Further, the plurality of microprotrusions can be arranged substantially uniformly, for example, near the center of the lens. In one embodiment, the surface having the microprotrusions is a convex surface. In one embodiment, the convex surface having the microprotrusion is the object-side surface. By providing the microprotrusions on the object-side surface of the spectacle lens, it is possible to suppress the progress of ametropia, such as myopia, of the wearer of the spectacles equipped with the spectacle lens.

As the lens substrate, various lens substrates generally used for spectacle lenses can be used. The lens substrate can be, for example, a plastic lens substrate or a glass lens substrate. The glass lens substrate can be, for example, a lens substrate made of inorganic glass. The lens substrate may be a plastic lens substrate from the viewpoint of being lightweight and difficult to break. Examples of plastic lens substrates include styrene resins such as (meth)acrylic resins, polycarbonate resins, allyl resins, allyl carbonate resins such as diethylene glycol bisallyl carbonate resin (CR-39), vinyl resins, polyester resins, polyether resins, urethane resins obtained by reacting an isocyanate compound with a hydroxy compound such as diethylene glycol, thiourethane resins obtained by reacting an isocyanate compound with a polythiol compound, and a cured product (generally referred to as a transparent resin) obtained by curing a curable composition including a (thio)epoxy compound having at least one disulfide bond in a molecule. The curable composition can also be referred to as a polymerizable composition. The lens substrate may be an unstained one (colorless lens) or a stained one (stained lens). The thickness and diameter of the lens substrate are not particularly limited. For example, the thickness (center thickness) can be about 1 mm to 30 mm, and the diameter can be about 50 mm to 100 mm. The refractive index of the lens substrate can be, for example, about 1.60 to 1.75. However, the refractive index of the lens substrate is not limited to the above range, and may be within the above range or may be above or below thereof. In the present disclosure and the present description, the term “refractive index” refers to a refractive index with respect to light having a wavelength of 500 nm. The lens substrate can be molded by a known molding method such as casting polymerization. For example, by molding a lens substrate by casting polymerization using a mold having a molding surface with microdepressions, a lens substrate having microprotrusions on at least one surface can be obtained.

[Coating Film]

One embodiment of a coating film formed on the surface of the lens substrate having microprotrusions can be exemplified by a cured layer formed by curing a curable composition including a curable compound. Such a cured layer is generally called a hard coat layer, and can contribute to improvement in durability of the spectacle lens. The curable compound means a compound having a curable functional group, and the curable composition means a composition including one or more curable compounds.

One embodiment of the curable composition for forming the cured layer can be exemplified by a curable composition including an organosilicon compound as a curable compound, and can also be exemplified by a curable composition including metal oxide particles together with the organosilicon compound. The curable composition capable of forming the cured layer can be exemplified by the curable composition described in JP-A-S63-10640.

Further, one embodiment of the organosilicon compound can also be exemplified by an organosilicon compound represented by a following general formula (I) and a hydrolyzate thereof.

$$(R^1)_a(R^3)_bSi(OR^2)_{4-(a+b)} \quad (I)$$

In the general formula (I), $R^1$ represents an organic group having a glycidoxy group, an epoxy group, a vinyl group, a methacryloxy group, an acryloxy group, a mercapto group, an amino group, a phenyl group, and the like, $R^2$ represents an alkyl group having 1 to 4 carbon atoms, an acyl group having 1 to 4 carbon atoms or an aryl group having 6 to 10 carbon atoms, $R^3$ represents an alkyl group having 1 to 6 carbon atoms or an aryl group having 6 to 10 carbon atoms, and a and b each represent 0 or 1.

The alkyl group having 1 to 4 carbon atoms represented by $R^2$ is a linear or branched alkyl group, and specific examples thereof include a methyl group, an ethyl group, a propyl group, a butyl group, and the like.

Examples of the acyl group having 1 to 4 carbon atoms represented by $R^2$ include an acetyl group, a propionyl group, an oleyl group, a benzoyl group, and the like.

Examples of the aryl group having 6 to 10 carbon atoms represented by $R^2$ include a phenyl group, a xylyl group, a tolyl group, and the like.

The alkyl group having 1 to 6 carbon atoms represented by $R^3$ is a linear or branched alkyl group, and specific examples thereof include a methyl group, an ethyl group, a propyl group, a butyl group, a heptyl group, a hexyl group, and the like.

Examples of the aryl group having 6 to 10 carbon atoms represented by $R^3$ include a phenyl group, a xylyl group, a tolyl group, and the like.

Specific examples of the compound represented by the general formula (I) include the compounds described in paragraph 0073 of JP-A-2007-077327. Since the organosilicon compound represented by the general formula (I) has a curable group, a hard coat layer can be formed as a cured layer by performing a curing treatment after the application.

The metal oxide particles can contribute to adjusting the refractive index and improving the hardness of the cured layer. Specific examples of the metal oxide particles include tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), antimony oxide ($Sb_2O_5$) and the like, and these can be used alone or in combination of two or more metal oxide particles. From the viewpoint of achieving both the scratch resistance and the optical characteristics of the cured layer, the particle diameter of the metal oxide particles is, for example, in the range of 5 nm to 30 nm. The amount of the metal oxide particles in the curable composition can be set, as appropriate, in consideration of the refractive index and hardness of the formed cured layer, and usually can be set to about 5% by mass to 80% by mass per solid content of the curable composition. From the viewpoint of dispersibility in the cured layer, the metal oxide particles may be colloidal.

The cured layer can be formed, for example, by directly applying a curable composition prepared by mixing the above components and, if necessary, optional components such as an organic solvent, a surfactant (leveling agent), and a curing agent to the surface of the lens substrate that has microprotrusions, or by forming a coating layer by indirectly applying the curable composition, with another layer being interposed between the lens substrate and the curable composition, and performing a curing treatment (for example, heating and/or light irradiation) corresponding to the type of the curable compound on the coating layer. Details of the application of the curable composition will be described later. For example, when the curing treatment is performed by heating, the lens substrate on which the coating layer of the curable composition has been formed is placed in an environment at an ambient temperature of 50° C. to 150° C. for about 30 min to 2 h, so that the curing reaction of the curable compound in the coating layer can be advanced.

From the viewpoint of suitability for application by spin coating, the viscosity of the curable composition for forming a coating film on the surface of the lens substrate having microprotrusions is, for example, in the range of 1 mPa·s to 50 mPa·s, in the range of 1 mPa·s to 40 mPa·s, or in the range of 1 mPa·s to 20 mPa·s. The viscosity in the present disclosure and in the present description refers to the viscosity at a liquid temperature of 25° C.

Further, one embodiment of the coating film formed on the surface of the lens substrate having microprotrusions can be exemplified by a coating film that is generally called a primer layer and contributes to the improvement of interlayer adhesion. An application liquid capable of forming such a coating film can be exemplified by a composition (hereinafter, referred to as a "dry-solidifying composition") in which a resin component such as a polyurethane resin is dispersed in a solvent (water, an organic solvent, or a mixed solvent thereof). The solidification of such a composition is advanced by removing the solvent by drying. Drying can be performed by a drying treatment such as air drying or heat drying.

From the viewpoint of suitability for application by spin coating, the viscosity of the dry-solidifying composition for forming the coating film on the surface of the lens substrate having microprotrusions is, for example, in the range of 1 mPa·s to 50 mPa·s, in the range of 1 mPa·s to 40 mPa·s, or in the range of 1 mPa·s to 20 mPa·s.

[Application of Application Liquid]

In the manufacturing method, the application of the application liquid for forming the coating film on the surface of the lens substrate having microprotrusions is performed by spin coating. By performing the application by spin coating, it is possible to suppress the film thickness unevenness of the coating film which is due to, for example, the formation of a liquid pool around the microprotrusions. The application by spin coating can be performed, for example, by arranging the lens substrate having microprotrusions on the spin coater so that the surface having the microprotrusions faces vertically upward, and supplying an application liquid from above on the surface (for example, discharging the application liquid from a nozzle disposed above the surface) while rotating the lens substrate on the spin coater. Here, from the viewpoint of forming a coating film having a more uniform film thickness, the rotation speed of the lens substrate in spin coating is, for example, in the range of 10 rpm to 3000 rpm (rotations per minute), in the range of 50 rpm to 2500 rpm, or in the range of 100 rpm to 2000 rpm.

After the application, a coating film can be formed by performing a treatment (for example, curing, drying, or the like) according to the type of the application liquid.

The film thickness of the coating film formed through the above steps can be, for example, in the range of 0.5 μm to 100 μm. However, the thickness of the coating film is determined according to the function required of the coating film, and is not limited to the above-described range.

One or more coating films can be also further formed on the abovementioned coating film. Examples of such coating films include various coating films such as an antireflection layer, a water-repellent or hydrophilic antifouling layer, an antifogging layer, and the like. Known techniques can be adopted to form these films.

In addition, when one surface of the lens substrate does not have microprotrusions, one or more coating films can be formed on such a lens substrate surface. Examples of such coating films include various coating films usually provided on spectacle lenses (for example, a hard coat layer, a primer layer, an antireflection layer, an antifouling layer, an antifogging layer, and the like), and known techniques can be adopted to form these films.

EXAMPLES

Hereinafter, the present disclosure will be further described with reference to examples. However, the present disclosure is not limited to the embodiments shown in the examples.

Examples 1 to 3

1. Preparation of Application Liquid

A total of 30 parts by mass of methanol as a solvent was added to 35 parts by mass of γ-glycidoxypropyltrimethoxysilane (KBM-403 manufactured by Shin-Etsu Chemical Co., Ltd.) as an organosilicon compound.

After stirring this for 10 min, 1.0 part by mass of 1 mol/L nitric acid was added as a pH adjuster, followed by additional stirring for 10 min. To the solution thus obtained, 35 parts by mass of colloidal silica (LUDOX AM, manufactured by W. R. Grace & Co.) was added and stirred at room temperature for 24 h.

After stirring for 24 h, 1 part by mass of aluminum acetylacetonate as a curing agent and 0.1 part by mass of a leveling agent (FZ-77, manufactured by Dow Corning Toray Co., Ltd.) were added, and the mixture was further stirred at room temperature for 48 hours to prepare a curable composition (application liquid for forming a hard coat layer). The viscosity of the obtained curable composition was 10 mPa·s (liquid temperature 25° C.).

2. Molding of Lens Substrate Having Microprotrusions

A mold having a plurality of microdepressions on the molding surface for molding the object-side surface was used, and a plastic lens substrate having a plurality of microprotrusions on the object-side surface was molded by casting polymerization (object-side surface: convex surface, eyeball-side surface: concave surface). On the object-side surface, a plurality of microprotrusions was formed almost uniformly near the center. The formed microprotrusions were spherical protrusions having a diameter of 1 mm, a height of 1.0 μm, and a curvature of 86 mmR, and the distance between the adjacent microprotrusions was 0.5 mm.

3. Formation of Coating Film

The lens substrate molded as described in section 2. hereinabove was arranged on a spin coater with the object-side surface facing vertically upward. The curable composition prepared as described in section 1. hereinabove was discharged onto the object-side surface from a nozzle disposed above the object-side surface, while rotating the lens substrate on the spin coater (rotation speed: see Table 1), thereby applying the curable composition to the object-side surface and forming a coating layer.

Thereafter, the lens substrate on which the coating layer was formed was placed in a heating furnace and subjected to heat treatment, whereby the coating layer was cured to form a cured layer (hard coat layer).

Thus, a spectacle lens in which a coating film was formed on the surface of the lens substrate having a plurality of microprotrusions was obtained.

Comparative Examples 1 and 2

A cured layer was formed on the object-side surface of a lens substrate in the same manner as in Example 1, except that the curable composition was applied by dip coating (the lens substrate was immersed in the curable composition) (pull-up speed: see Table 1).

[Measurement of Film Thickness at Each Part of Coating Film]

For each of the spectacle lenses obtained in Examples 1 to 3 and Comparative Examples 1 and 2, the film thickness of the coating film was measured by a non-contact type film thickness measuring device (non-contact film thickness meter FF8 manufactured by System Road Co., Ltd.) at the following three positions: a, b, and c. Table 1 shows the thickness of the film measured at each position.

Position a: the vertex of the microprotrusion.

Position b: position 0.01 mm away from the end portion of the microprotrusion.

Position c: position 1 mm away from the end portion of the microprotrusion.

TABLE 1

| | Film thickness at each position [μm] | | | |
|---|---|---|---|---|
| | a | b | c | Coating conditions |
| Comparative example 1 | 1.1 | 1.3 | 1.0 | Pull-up speed: 1.5 mm/sec |
| Comparative example 2 | 1.5 | 1.8 | 1.6 | Pull-up speed: 2.0 mm/sec |
| Example 1 | 1.1 | 1.1 | 1.1 | Rotation speed: 1500 rpm |
| Example 2 | 1.5 | 1.6 | 1.5 | Rotation speed: 1200 rpm |
| Example 3 | 2.0 | 2.1 | 2.0 | Rotation speed: 1000 rpm |

The film thickness measured at the position b near the end portion of the microprotrusion in Comparative Example 1 and Comparative Example 2 shown in Table 1 is larger than the film thickness at other positions a and c. This is considered to be due to the fact that the occurrence of liquid pool near the end portion of the microprotrusion could not be suppressed in dip coating.

Meanwhile, the film thicknesses of the coating films measured for Examples 1 to 3 shown in Table 1 are almost the same at positions a, b, and c. Therefore, it can be confirmed that coating films having excellent uniformity of the film thickness were formed on the surface having microprotrusions in Examples 1 to 3.

Lastly, the above-mentioned embodiments are summarized.

According to one embodiment, there is provided a method for manufacturing a spectacle lens, wherein the spectacle lens includes a lens substrate having microprotrusions on at least one surface, and a coating film formed on the surface of the lens substrate that has the microprotrusions; and the method includes forming the coating film by applying an application liquid, through spin coating, to the surface of the lens substrate that has the microprotrusions.

According to the manufacturing method, it is possible to manufacture a spectacle lens in which a coating film having excellent uniformity of the film thickness is formed on the surface that has microprotrusions.

In one embodiment, the application liquid can be a curable composition including a curable compound, and the method can further include performing a curing treatment of the curable compound after the application.

In one embodiment, the curable composition can have a viscosity in the range of 1 mPa·s to 50 mPa·s.

In one embodiment, the spin coating can be performed by supplying the application liquid from above to a surface having the microprotrusions that rotates vertically upward.

In one embodiment, the coating film can have a thickness in a range of 0.5 μm to 100 μm.

Various embodiments described in this specification can be combined in any combination of two or more.

The embodiments disclosed this time are to be considered in all respects as illustrative and not restrictive. The scope of the present disclosure is defined by the terms of the claims, rather than the description above, and is intended to be inclusive of any modifications within the scope and meaning equivalent to the terms of the claims.

What is claimed is:

1. A method for manufacturing a spectacle lens, wherein the spectacle lens includes a lens substrate, which consists of a single member, the single member including a plurality of microprotrusions arranged on at least one surface of the lens substrate, the microprotrusions adjusting a refractive power of the spectacle lens, and a coating film formed directly on the surface of the lens substrate that has the microprotrusions;

the microprotrusions are spherical protrusions which have a height of 0.1 μm to 10 μm and a radius of curvature of 50 mmR to 250 mmR; and the method includes forming the coating film by applying an application liquid, through spin coating, directly to the surface of the lens substrate that has the microprotrusions.

2. The method for manufacturing a spectacle lens according to claim 1, wherein the application liquid is a curable composition including a curable compound, and the method further includes performing a curing treatment of the curable compound after the application.

3. The method for manufacturing a spectacle lens according to claim 2, wherein the curable composition has a viscosity in the range of 1 mPa·s to 50 mPa·s.

4. The method for manufacturing a spectacle lens according to claim 1, wherein the spin coating is performed by supplying the application liquid from above to a surface having the microprotrusions that faces vertically upward during spinning.

5. The method for manufacturing a spectacle lens according to claim 1, wherein the coating film has a thickness in a range of 0.5 μm to 100 μm.

6. The method for manufacturing a spectacle lens according to claim 1, wherein the application liquid is a composition in which a resin component is dispersed in a solvent.

* * * * *